US012768327B2

(12) United States Patent
Bilen et al.

(10) Patent No.: US 12,768,327 B2
(45) Date of Patent: Oct. 20, 2026

(54) PREDICTIVE ENGINE STOP-START BASED ON CLUTCH ENERGY

(71) Applicant: VOLVO TRUCK CORPORATION, Gothenburg (SE)

(72) Inventors: Ödül Bilen, Hisings Backa (SE); Henrik Ryberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 61 days.

(21) Appl. No.: 18/932,978

(22) Filed: Oct. 31, 2024

(65) Prior Publication Data

US 2025/0163878 A1 May 22, 2025

(30) Foreign Application Priority Data

Nov. 22, 2023 (EP) .................................... 23211618

(51) Int. Cl.
*F02N 11/08* (2006.01)
*B60W 10/06* (2006.01)

(52) U.S. Cl.
CPC ...... *F02N 11/0833* (2013.01); *F02N 2200/08* (2013.01)

(58) Field of Classification Search
CPC .... F02N 11/0818; F02N 11/0833; F02N 5/04; F02N 2200/08; F02N 2200/0802; F02N 2200/046; F02N 2300/2002; F02N 2300/2006; B60W 30/186; B60W 10/06; B60W 2510/02; B60W 2710/06; F02D 41/042; F02D 41/062; F02D 41/1401
See application file for complete search history.

(56) References Cited

U.S. PATENT DOCUMENTS

| | | | | |
|---|---|---|---|---|
| 7,247,123 | B2 | 7/2007 | Ohtake et al. | |
| 9,267,481 | B2 * | 2/2016 | Takamura | B60W 30/192 |
| 10,953,879 | B2 | 3/2021 | Akita et al. | |
| 2014/0004997 | A1 * | 1/2014 | Wang | B60W 30/20 180/65.265 |
| 2016/0311433 | A1 * | 10/2016 | Shelton | B60W 10/02 |
| 2018/0080425 | A1 | 3/2018 | Ose et al. | |
| 2021/0339733 | A1 * | 11/2021 | Saito | B60W 30/182 |

FOREIGN PATENT DOCUMENTS

| | | | |
|---|---|---|---|
| DE | 102014225657 | A1 | 6/2016 |

OTHER PUBLICATIONS

Extended European Search Report in corresponding European Application No. 23211618.6 dated May 8, 2024 (8 pages).
"Predictive Engine Start-Stop Based On Clutch Energy", Research Disclosure Questel Ireland Ltd, Kenneth Mason Publications, Hampshire, UK, GB; vol. 717, No. 6, Nov. 27, 2023, XP007152037, ISSN: 0374-4353, Retrieved from the Internet: URL:h ttps://www.researchdisclosure.com/database/RD717006 (38 pages).

* cited by examiner

*Primary Examiner* — Grant Moubry
(74) *Attorney, Agent, or Firm* — Jeffri A. Kaminski; Venable LLP

(57) ABSTRACT

A computer system has processing circuitry to determine an energy level in a controllable clutch between a gearbox and a combustion engine of a vehicle powertrain. The energy level is indicative of the induced energy in the clutch during a time duration prior to determining the energy level. At least one of an engine start function and an engine off function are controlled depending on the determined energy level in relation to an energy threshold level.

17 Claims, 4 Drawing Sheets

PREDICTIVE ENGINE STOP-START BASED ON CLUTCH ENERGY

TECHNICAL FIELD

The disclosure relates generally to controlling internal combustion engine start and stop. In particular aspects, the disclosure relates to predictive engine stop-start based on clutch energy. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

During freewheeling with a vehicle, the internal combustion engine may be turned off to save fuel. When starting the engine again, a starter motor is often employed to spin up the engine. However, the lifetime for the starter motor is limited and excessive use of the start motor risks depleting the battery powering the start motor.

Another option is to start the engine using the clutch although this may wear out the clutch unnecessarily fast.

SUMMARY

According to a first aspect of the disclosure, there is provided a computer system comprising processing circuitry configured to: determine an energy level in a controllable clutch between a transmission and a combustion engine of a vehicle powertrain, the energy level is indicative of the induced energy in the clutch during a time duration prior to determining the energy level, control at least one of an engine start function and an engine off function depending on the determined energy level in relation to an energy threshold level.

The first aspect of the disclosure may seek to enable efficient use of the clutch in relation to engine start and engine stop. A technical benefit may include reduced wear on the clutch when using it for engine start.

Optionally in some examples, including in at least one preferred example, the processing circuitry may be further configured to: determine the energy level and control the engine start function and engine off function during coasting of the vehicle. Coasting of the vehicle is one advantageous situation where the clutch may be advantageously used for engine start.

Optionally in some examples, including in at least one preferred example, the processing circuitry may be further configured to: control the at least one of the engine start function and the engine off function only when the determined energy level is below the energy threshold level. A technical benefit may include reduce wear on the clutch since the engine start and engine off functions are only used when the energy level is below the threshold.

Optionally in some examples, including in at least one preferred example, the processing circuitry may be further configured to: calculate a predicted energy level in the clutch, the predicted energy level being a sum of the determined energy level and a potential additional energy resulting from using the clutch for engine start function, determine that the predicted energy level is below the energy threshold level, and control the clutch for performing the engine start function. A technical benefit may include that the clutch may be used for engine start only when the wear on the clutch can be kept low, thus minimizing the wear while still allowing using the clutch and at the same time avoid using the start motor.

Optionally in some examples, including in at least one preferred example, the processing circuitry may be further configured to: calculate a predicted energy level in the clutch, the predicted energy level being a sum of the determined energy level and a potential additional energy resulting from using the clutch for engine start function, determine that the predicted energy level exceeds or is equal to the energy threshold level, and control a starter motor for performing the engine start function. A technical benefit may include that excessive wear on the clutch is avoided, thus prolonging its lifetime.

Optionally in some examples, including in at least one preferred example, the processing circuitry may be further configured to: calculate a predicted energy level in the clutch, the predicted energy level being a sum of the determined energy level and a potential additional energy resulting from using the clutch for engine start function, determine that the predicted energy level exceeds or is equal to the energy threshold level, and control the engine off function and engine start function to avoid engine off. A technical benefit may include that excessive wear on the clutch and stater motor is avoided since the engine is kept on.

Optionally in some examples, including in at least one preferred example, the processing circuitry may be further configured to: calculate a predicted energy level in the clutch, the predicted energy level being a sum of the determined energy level and a potential additional energy resulting from using the clutch for engine start function, determine that the predicted energy level is below the energy threshold level, and control the engine off function and engine start function to turn off the engine. A technical benefit may include that the fuel consumption is reduced.

Optionally in some examples, including in at least one preferred example, the processing circuitry may be further configured to: determine the energy level in the clutch in response to that at least one of the following occurs: vehicle travelling start with the internal combustion engine running; start of the internal combustion engine using the clutch when the vehicle is moving; and a gear shift that enables engine acceleration using the clutch without fuel injection. A technical benefit may include that the processing circuitry need only operate the method when it is best needed, thereby optimizing the use of the processing circuitry.

There is further provided a vehicle power train comprising a gearbox, a combustion engine, and a controllable clutch, the gearbox being coupled to the combustion engine by the controllable clutch, the vehicle power train further comprising the computer system of any the first aspect.

There is further provided a vehicle comprising the computer system of the first aspect and/or the power train.

According to a second aspect of the disclosure, there is provided a computer-implemented method, comprising: determining, by processing circuitry of a computer system, an energy level in a controllable clutch between a transmission and a combustion engine of a vehicle powertrain, the energy level is indicative of the induced energy in the clutch during a time duration prior to determining the energy level, and controlling, by the processing circuitry, at least one of an engine start function and an engine off function depending on the determined energy level in relation to an energy threshold level.

The second aspect of the disclosure may seek to may seek to enable efficient use of the clutch in relation to engine start and engine stop. A technical benefit may include reduced wear on the clutch when using it for engine start.

Optionally in some examples, including in at least one preferred example, the method may comprise determining, by the processing circuitry, the energy level and control the engine start function and engine off function during coasting of the vehicle. Coasting of the vehicle is one advantageous situation where the clutch may be advantageously used for engine start and/or engine stop.

Optionally in some examples, including in at least one preferred example, the method may comprise: controlling, by the processing circuitry, the at least one of the engine start function and the engine off function only when the determined energy level is below the energy threshold level. A technical benefit may include reduce wear on the clutch since the engine start and engine off is only used when the energy level is below the threshold.

Optionally in some examples, including in at least one preferred example, the method may comprise: calculating, by the processing circuitry, a predicted energy level in the clutch, the predicted energy level being a sum of the determined energy level and a potential additional energy resulting from using the clutch for engine start function, determining, by the processing circuitry, that the predicted energy level is below the energy threshold level, and controlling, by the processing circuitry, the clutch for performing the engine start function. A technical benefit may include that the clutch may be used for engine start only when the wear on the clutch can be kept low, thus minimizing the wear while still allowing using the clutch and at the same time avoid using the start motor.

Optionally in some examples, including in at least one preferred example, the method may comprise: calculating, by the processing circuitry, a predicted energy level in the clutch, the predicted energy level being a sum of the determined energy level and a potential additional energy resulting from using the clutch for engine start function, determining, by the processing circuitry, that the predicted energy level exceeds or is equal to the energy threshold level, and controlling, by the processing circuitry, a starter motor for performing the engine start function. A technical benefit may include that excessive wear on the clutch is avoided, thus prolonging its lifetime.

Optionally in some examples, including in at least one preferred example, the method may comprise: calculating, by the processing circuitry, a predicted energy level in the clutch, the predicted energy level being a sum of the determined energy level and a potential additional energy resulting from using the clutch for engine start function, determining, by the processing circuitry, that the predicted energy level exceeds or is equal to the energy threshold level, and controlling, by the processing circuitry, the engine off function and engine start function to avoid engine off. A technical benefit may include that excessive wear on the clutch and stater motor is avoided since the engine is kept on.

Optionally in some examples, including in at least one preferred example, the method may comprise: calculating, by the processing circuitry, a predicted energy level in the clutch, the predicted energy level being a sum of the determined energy level and a potential additional energy resulting from using the clutch for engine start function, determining, by the processing circuitry, that the predicted energy level is below the energy threshold level, and controlling, by the processing circuitry, the engine off function and engine start function to turn off the engine. A technical benefit may include that the fuel consumption is reduced.

Optionally in some examples, including in at least one preferred example, the method may comprise: determining, by the processing circuitry, the energy level in the clutch in response to that at least one of the following occurs: vehicle travelling start with the internal combustion engine running; start of the internal combustion engine using the clutch when the vehicle is moving; and a gear shift that enables engine acceleration using the clutch without fuel injection. A technical benefit may include that the processing circuitry need only operate the method when it is best needed, thereby optimizing the use of the processing circuitry.

There is further provided a computer program product comprising program code for performing, when executed by the processing circuitry, the method of the second aspect.

There is further provided a non-transitory computer-readable storage medium comprising instructions, which when executed by the processing circuitry, cause the processing circuitry to perform the method of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

Figure 1:
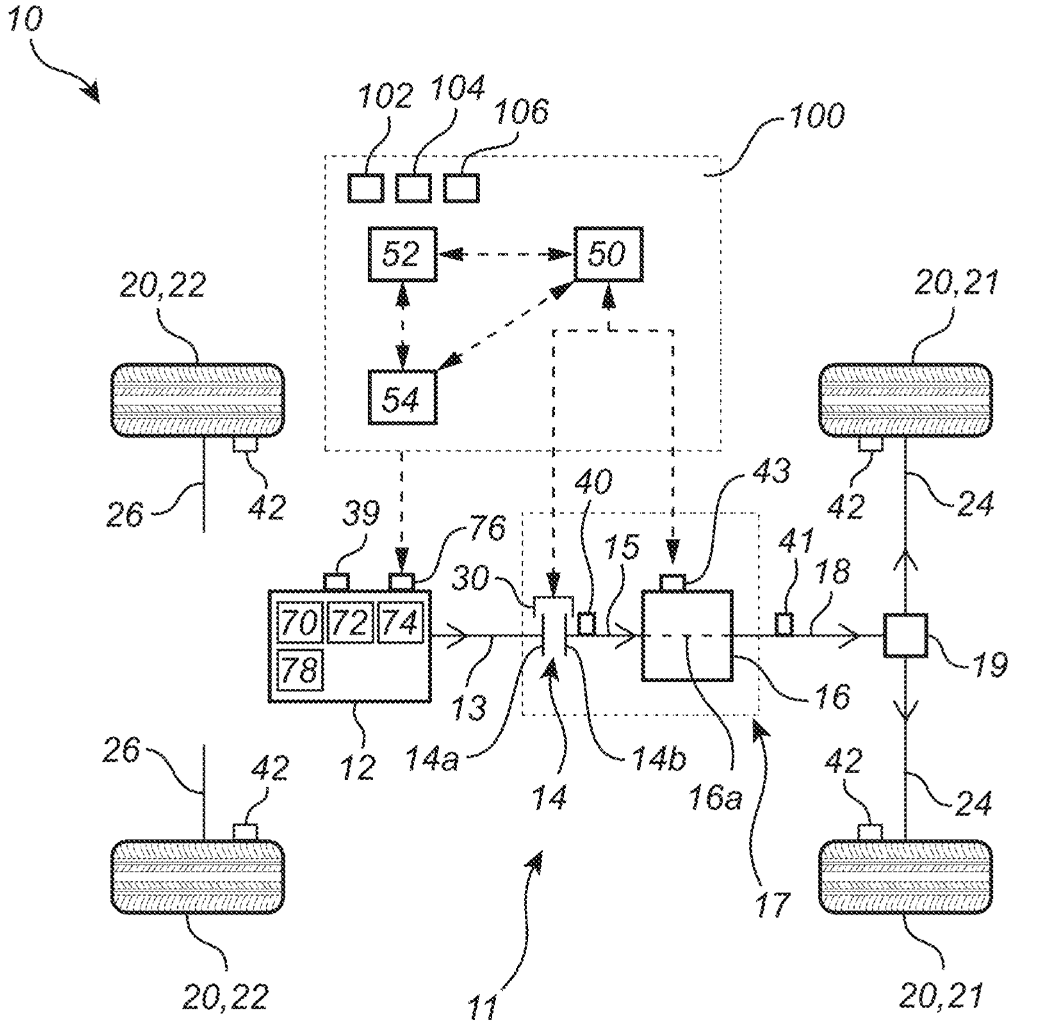
FIG. 1 schematically illustrates an exemplary vehicle comprising a computer system according to an example.

The detailed description set forth below provides information and examples of the disclosed technology with sufficient detail to enable those skilled in the art to practice the disclosure.

The present disclosure is at least partly based on the realization that restarting an engine, while the vehicle is moving, may still be challenging in terms of providing a desirable and long-term reliable operation of the vehicle. More specifically, in the field of heavy-duty vehicles, there is increasing demand for improving the fuel efficiency and reduce emissions of the internal combustion engine. One technology designed to improve the fuel efficiency and reduce emissions is an automatically controlled engine start system. The automatically controlled engine start system is here an integral part of a so-called automatic and predictive engine stop-and-start system for vehicles. Automatic and predictive engine stop-and-start systems are configured to automatically control one or more vehicle operations, such as restarting the engine, using predictive data and real-time information.

While the use of the automatic and predictive engine stop-and-start systems in heavy-duty vehicles provides a positive impact on the operation of the vehicle, there is still a challenge to further improve the operations of restarting the engine.

In one example, the engine can be restarted by a conventional starter motor. In other examples, the engine may be restarted by controlling the clutch in-between the engine and the transmission. In other words, automatic and predictive engine stop-and-start systems may be designed to start the engine by closing the clutch. A potential drawback is that starting the engine with the clutch implies generation of heat energy in the clutch raising the temperature of its surfaces and the wear of the clutch is strongly dependent on its temperature.

To remedy this, the present disclosure provides a control strategy to control engine start and engine stop depending on the present energy level in the clutch.

The disclosure may seek to improve, or at least ensure adequate, control of engine start and engine stop using one or the clutch or a starter motor in an efficient way to ensure that the energy generated in the clutch is kept below a threshold.

Using the clutch to restart the engine, while the vehicle is moving may be particularly useful for heavy-duty vehicle operating in a so-called freewheeling mode. Freewheeling in the context of present disclosure refers to a mode of operation where the engine is disengaged from the transmission (or gearbox) and effectively placed in neutral or a similar state. In this mode, the engine is not providing power to the wheels, and the vehicle coasts without the assistance of the engine's power output. This is in contrast to the normal operation of a vehicle, where the engine is engaged and provides power to the wheels to propel the vehicle forward.

The purpose of freewheeling in heavy-duty vehicles is to save fuel and reduce engine load under certain driving conditions. It is commonly used when the vehicle is descending downhill or traveling on a slope. By disengaging the engine and allowing the vehicle to coast freely, the heavy-duty vehicle can take advantage of gravitational forces to maintain or increase speed while consuming minimal fuel. This can be particularly useful for improving fuel efficiency and reducing wear and tear on the braking system during downhill descents.

Freewheeling can be engaged manually by the driver or automatically by the vehicle's control system, e.g. as a part of the automatic and predictive engine stop-and-start system. When the driver and/or an automatic vehicle control system initiates freewheeling, the transmission is typically shifted to a neutral or coasting position, decoupling the engine from the drivetrain. In some cases, the engine may idle at a minimal rpm to maintain essential functions like power steering and braking.

Freewheeling may also include a specific mode of operation where the engine is shutdown (in addition to being disengaged from the transmission). This mode of operation may be denoted as a freewheeling mode with the engine shutdown. When restarting the engine after a freewheeling period, in which the engine has been shutdown, it may be beneficial to use the clutch to spin up the engine speed instead of using a starter motor. The reason behind using the clutch to restart the engine is that the lifetime of the starter motor may be more limiting than the lifetime of the clutch system. Another reason is that starting the engine with the clutch instead of a starter motor may generally be more fuel efficient and has less energy losses overall, due to the fact that the energy used for the starter motor actuation goes through the alternator. However, the clutch is herein proposed to be used based on the energy in the clutch in relation to a threshold.

Moreover, the starter motor may also be dependent on the state of charge of the battery system. As the battery system may also power other functions within the vehicle, there is a risk of a partial blackout during an engine start attempt with the starter motor if the system voltage is on a low level.

To this end, the present disclosure proposes to determine an energy level in a controllable clutch between a transmission and a combustion engine of a vehicle powertrain, the energy level is indicative of the induced energy in the clutch during a time duration prior to determining the energy level. The time duration is immediately preceding the instance when the energy level is determined and may reflect the time during which energy was generated in the clutch. The control of at least one of an engine start function and an engine off function is then dependent on the determined energy level in relation to an energy threshold level. One example of a vehicle comprising such computer system will now be described in relation to a vehicle in the form of a heavy-duty vehicle.

FIG. 1 schematically illustrates an exemplary vehicle 10. The vehicle 10 in FIG. 1 comprises a powertrain system 11. The powertrain system 11 is adapted to power the vehicle 10.

In addition, as depicted in FIG. 1, the vehicle 10 comprises a computer system 100. In this example, the powertrain system 11 comprises the computer system 100. In other examples, the computer system 100 is a separate part of the vehicle, which is configured to be in communication with the powertrain system 11. The computer system 100 may also be a remote server configured to be in communication with the powertrain system 11.

The computer system 100 is configured to control the powertrain system 11. In addition, the computer system 100 is intended to control an engine start function and engine stop function of the vehicle 10. The computer system 100 is thus configured to control start and stop of the engine 12 of the vehicle 10.

The computer system 100 here comprises a processing circuitry 102. The operations of the processing circuitry 102 will be further described herein.

In FIG. 1, the computer system 100 also comprises a memory 104 and a system bus 106. These components and further optional technical details of the computer system 100 are described in relation to FIG. 5.

Turning again to FIG. 1, the powertrain system 11 comprises an internal combustion engine 12. For ease of reference, the internal combustion engine will be denoted as the engine. The engine 12 comprises at least one cylinder 74 having a combustion chamber 70 and a reciprocating piston 72. More specifically, the engine 12 comprises a plurality of cylinders 74, each one having a corresponding combustion chamber 70 and a corresponding piston 72 arranged therein.

The powertrain system 11 also comprises a fuel injector 78, as illustrated in FIG. 1. The fuel injector 78 is here an integral part of the engine 12. The fuel injector 78 is configured to inject fuel into the engine 12. The fuel injector 78 may be any suitable type of injector capable of injecting fuel such as a diesel fuel, a gaseous fuel and the like. In general, the fuel injector 78 is arranged in the cylinder 74, and axially above the piston 72. Each one of the cylinders 74 of the engine 12 comprises a corresponding fuel injector 78. The fuel injector 78 is controllable by the computer system 100. By way of example, the fuel injector 78 is controllable by the processing circuitry 102 of the computer system 100.

The engine 12 is configured to output a rotational speed via an engine output shaft 13, as illustrated in e.g. FIG. 1. Hence, the powertrain system 11 comprises the engine output shaft 13.

The engine 12 is generally configured to operate in a conventional four stroke fashion, i.e. operated by an intake stroke, a compression stroke, a combustion stroke, and an exhaust stroke. In this example, the engine is an internal diesel combustion engine, i.e. an engine designed to work according to the diesel process. By way of example, the engine 12 is a compression ignition internal combustion engine. The engine 12 may also be provided in other types of configurations or be operated by other types of fuels. The components of an engine are well-known, and thus not further described herein.

The powertrain system 11 here also comprises a starter motor 76. The starter motor 76 is here an integral part of the engine 12. Alternatively, the starter motor 76 is operatively connected to the engine 12 to allow the starter motor 76 to crank the engine 12, as is commonly known in the art. As such, the starter motor 76 is configured to crank the engine 12. Engine cranking is performed by controlling the starter motor 76 to engage a flywheel so as to initiate combustion.

Moreover, the powertrain system 11 comprises a transmission arrangement 17. The transmission arrangement 17 comprises a transmission, or gearbox 16, and a controllable clutch 14.

The gearbox 16 has a number of gear stages to obtain a set of gears. Each one of the gears has a corresponding gear ratio. The transmission arrangement 17 may sometimes be denoted simply as the transmission.

The transmission arrangement 17 is operatively connected to the engine 12 via a transmission input shaft 15. Therefore, the transmission arrangement 17 comprises the transmission input shaft 15. The transmission input shaft 15 rotates with a certain rotational speed while the vehicle 10 is moving. Hence, the transmission input shaft 15 has a corresponding rotational speed. The transmission input shaft 15 is one example of a powertrain shaft. The transmission arrangement 17 also has a transmission output shaft 18 for providing a rotational speed to one or more drive wheels 20 of the vehicle 10, as schematically illustrated in FIG. 1. Briefly stated, the engine output shaft 13 transmits rotational speed from the engine 12 to the transmission arrangement 17 which further transmits the motion via the transmission output shaft 18 to the drive wheels 20, which in FIG. 1 is a pair of rear wheels 21.

The transmission output shaft 18 rotates with a certain rotational speed while the vehicle is moving. Hence, the transmission output shaft 18 has a corresponding rotational speed. The transmission output shaft 18 is another example of a powertrain shaft.

As illustrated in FIG. 1, the vehicle 10 here comprises a pair of front wheels 22 and the pair of rear wheels 21. Moreover, the rear wheels 21 are here driven wheels, while the front wheels 22 are non-driven wheels. The driven wheels 21 are operatively connected to corresponding rotational driven axles 24. The non-driven wheels 22 are operatively connected to corresponding rotational non-driven axles 26. In general, the vehicle 10 comprises one or more driven wheels and one or more non-driven wheels. The driven wheels 21 are driven by the powertrain system 11.

As such, the pair of front wheels 22 are here operatively connected to the respective non-driven axles 26. In a similar way, the pair of rear wheels 21 are here operatively connected to the respective driven axles 24.

The transmission arrangement 17 is one of a semi-automatic transmission arrangement and an automatic transmission arrangement. Automatic transmission arrangements are common in heavy-duty vehicles to control engagement and disengagement of e.g. an automated disk-clutch between the engine and the transmission arrangement. An automatic transmission arrangement is typically made up of the input shaft 15, the intermediate shaft 16*a*, which has at least one gearwheel in engagement with a gearwheel on the input shaft 15, and an internal main shaft (not shown) with gearwheels which engage with gearwheels on the intermediate shaft 16*a*. The internal main shaft is also connected to the transmission output shaft 18 coupled to the driving wheels 21 via, for example, the drive shaft(s) 24.

The drive shaft 24 rotates with a certain rotational speed while the vehicle 10 is moving. Hence, the drive shaft 24 has a corresponding rotational speed. The drive shaft 24 is another example of a powertrain shaft.

In one example, when the transmission arrangement 17 comprises the intermediate shaft 16*a* arranged in the transmission arrangement 17, the transmission intermediate shaft 16*a* rotates with a certain rotational speed while the vehicle is moving. Hence, the transmission intermediate shaft 16*a* has a corresponding rotational speed. The transmission intermediate shaft 16*a* is another example of a powertrain shaft.

The transmission arrangement 17 may be an automated manual transmission (AMT), configured to transmit torque to the drive wheels 21. Typically, the transmission arrangement 17 is configured to transmit torque to the drive wheels 21 via the transmission output shaft 18 via one or more driven wheel shafts 24 or the like. In other words, the vehicle 10 is typically provided with an engine 12 operatively connected to the transmission arrangement 17, such as an automated manual transmission (AMT), for transmitting torque to the vehicle driven wheels 21.

As mentioned above, and as also illustrated in FIG. 1, the powertrain system 11 also comprises the clutch 14. The clutch 14 is here a controllable clutch. The controllable clutch 14 is e.g. controllable by a processing circuitry 102 of a computer system 100, as will be further described herein. Hence, the term controllable clutch refers to a clutch that is configured to be controllable by a processing circuitry, such as the processing circuitry 102. For ease of reference, the controllable clutch may simply be referred to as the clutch 14. The clutch 14 can be arranged in several manners in the powertrain system 11. In FIG. 1, the controllable clutch 14 is arranged in-between the engine 12 and gear box 16 of the transmission arrangement 17. The controllable clutch 14 is configured to operatively connect the transmission arrangement 17 with the engine 12. In particular, the controllable clutch 14 is configured to operatively connect the engine output shaft 13 of the engine 12 to the transmission input shaft 15 of the transmission arrangement 17. As such, the engine output shaft 13 of the engine 12 can be operatively connected to the transmission input shaft 15 of the transmission arrangement 17 via the controllable clutch 14 when a gear is engaged. As is commonly known in the art, the transmission arrangement 17 and the clutch 14 are hereby operable to select a gear ratio between the engine 12 and a pair of the driven wheels 21.

While FIG. 1 schematically illustrates an example where the transmission arrangement 17 includes the controllable clutch 14, the controllable clutch 14 can also be a standalone device of the powertrain system 11.

The controllable clutch 14 may comprise various components, including a pressure plate 14*b* and a clutch plate 14*a* (also known as a friction disc) positioned between the engine's flywheel (not illustrated) and the transmission's input shaft 15. When the clutch 14 is engaged, the clutch plate 14*a* is pressed against the flywheel, enabling power transfer. The pressure plate 14*b* is responsible for applying force to the clutch plate 14*a* to keep it engaged with the flywheel. The controllable clutch 14 may generally also comprise bearings, such as thrust bearings, and a clutch fork. These components are well-known components of the clutch. A relative rotational speed between the pressure plate 14*b* and a clutch plate 14*a* is known as e.g., a slipping speed, clutch slip, or sliding speed.

The controllable clutch 14 further comprises a clutch actuator 30. The clutch actuator 30 is configured to control the controllable clutch 14. By way of example, the clutch actuator 30 is e.g. configured to control (move) the pressure plate 14*b*, as is commonly known in the art.

To sum up, the controllable clutch 14 is a mechanical component configured to transfers power from the engine 12 into the transmission arrangement 17. Moreover, the controllable clutch 14 is configured to disconnect the engine 12 from the gearbox 16 and the rest of the transmission arrangement 17, when required. The controllable clutch 14 is thus configured for transmitting the rotational torque from the engine 12 to the driven wheels 21. By way of example, the controllable clutch 14 is one of a single clutch unit, a dual-clutch unit, or any other type of multi-clutch unit.

The controllable clutch 14 is controlled by the computer system 100. In particular, the controllable clutch 14 is controlled by the processing circuitry 102 of the computer system 100. By way of example, the controllable clutch 14 is controlled by the processing circuitry 102 of the computer system 100 via the clutch actuator 30, as illustrated in FIG. 1.

The controllable clutch 14 allows the computer system 100 to engage or disengage the engine's power from the wheels 20. The controllable clutch 14 is thus configured to engage the engine 12 to the gearbox 16 as well as to disengage the engine 12 from the gearbox 16. The controllable clutch 14 can also be used to allow smooth starts through clutch control, which partially engages allowing the clutch to slip. In this example, the controllable clutch 14 is also controlled to restart the engine 12 while the vehicle 10 is moving. As such, the controllable clutch 14 may be used for restarting the engine 12.

Optionally, the vehicle 10 also includes a differential function 19 arranged in-between the pair of driven wheels 21 and the transmission arrangement 17. The differential function 19 operatively connects the output shaft 18 of the transmission arrangement 17 with the driven axles 24. The differential function 19 is a well-known standard component and thus not further described herein.

The vehicle 10 may optionally include a service brake unit (not shown). The service brake unit may be a wet brake type or a dry brake type. The service brake unit is typically configured for performing a brake function. As an example, the service brake unit is a wheel brake. In addition, a service brake unit may be provided for each wheel.

The powertrain system 11 here also comprises one or more sensors configured to measure a speed parameter. The vehicle 10 comprises one or more sensors configured to measure a speed parameter. In FIG. 1, the powertrain system 11 comprises a speed sensor 40 configured to determine a rotational speed of the input shaft 15 of the transmission 17. As such, the speed sensor 40 is arranged and configured to monitor a speed parameter, such as the rotational speed level of the input shaft 15. The monitored rotational speed level of the input shaft 15 is transferred to the processing circuitry 102. Accordingly, the processing circuitry 102 is configured to obtain real-time rotational speed level of the input shaft 15 from the sensor 40. For example, the processing circuitry 102 can calculate a differential in rotational speed of the input shaft 15 between two different time instances.

In addition, a speed sensor 39 configured to measure the rotational speed of the output shaft 13, for example by measuring the speed at a flywheel of the engine 12.

In addition, or alternatively, in FIG. 1, the powertrain system 11 optionally comprises a speed sensor 41 configured to determine a rotational speed of the output shaft 18 of the transmission 18. As such, the speed sensor 41 is arranged and configured to monitor a speed parameter, such as the rotational speed level of the output shaft 18. The monitored rotational speed level of the output shaft 18 may be transferred to the processing circuitry 102. Accordingly, the processing circuitry 102 is configured to obtain real-time rotational speed level of the output shaft 18 from the sensor 41.

In addition, or alternatively, in FIG. 1, the powertrain system 11 optionally comprises a speed sensor 43 configured to determine a rotational speed of the intermediate shaft 16*a* of the transmission 18. As such, the speed sensor 43 is arranged and configured to monitor a speed parameter, such as the rotational speed level of the intermediate shaft 16*a*. The monitored rotational speed level of the intermediate shaft 16*a* may be transferred to the processing circuitry 102. Accordingly, the processing circuitry 102 is configured to obtain real-time rotational speed level of the intermediate shaft 16*a* from the sensor 43.

Most importantly, the sliding or slipping speed of the clutch 14 being the differential rotational speed between the pressure plate 14*b* and the clutch plate 14*a* may be determined from the difference between the rotational speed measured by the sensor 40 and the rotational speed measured by the sensor 39.

If need be, it is possible to calculate the rotational speed of the input shaft 15 based on the rotational speeds at one or more of the shafts 16*a* and based on knowledge of the gear ratios and/gearing of the gear box 16. For completeness, the vehicle may include wheel speed sensor(s) 42.

Each one of the sensors 39 and 40, and optionally sensors 41, and 43 are configured to be in communication with the processing circuitry 102 of the computer system 100. In this way, each one of the sensors 39, 40, and optionally sensors 41 and 43 are configured to measure a rotational speed level of the respective shaft and/or wheel, and transfer the rotational speed level to the processing circuitry 102. As such, the processing circuitry 102 is configured to obtain real-time data about the rotational speed level of the corresponding shaft and/or wheel.

Turning again to the transmission arrangement 17. The transmission arrangement 17 may be configured to be controlled by the driver and/or automatically via an electronic control unit (ECU). One example of an ECU is a transmission control unit. In FIG. 1, the powertrain system 11 comprises the transmission control unit (TCU) 50. By way of example, the TCU 50 is an integral part of the computer system 100. The TCU 50 is configured to control the transmission arrangement 17. Hence, the TCU 50 is configured to control the controllable clutch 14 and the gearbox 16.

The computer system 100 may also comprise an automatically controlled engine start and stop system 54. The automatically controlled engine start and stop system 54 is configured to automatically control the operation of restarting the engine 12 while the vehicle 10 is moving. The automatically controlled engine start and stop system 54 is here an integral part of an automatic and predictive engine stop-and-start system. Such system is configured to predict suitable situations where the engine can be shutdown and restarted, while the vehicle 10 is moving, and also configured to control the shutdown and restart of the engine 12, while the vehicle 10 is moving. The automatically controlled engine start system 54 may include a predictive cruise control system, or at least be configured to communicate with a predictive cruise control system of the vehicle 10. Hence, the computer system 100 may also comprise the predictive cruise control system. The predictive cruise control system is configured to control the powertrain system 11 based on predicted changes in relation to the route ahead of the vehicle 10. A predictive cruise control system may generally be configured to control the vehicle 10 based on topographical and route data. The predictive cruise control system may comprise, or communicate with, a radar or lidar sensors used to detect vehicles and obstacles ahead, camera system to provide visual data about the road and traffic conditions, GPS (Global Positioning System) to determine the vehicle position. The predictive cruise control system may further be configured to provide, or acquire, information about the road ahead, including changes in terrain, curves, and upcoming traffic conditions, speed and distance settings, brake control data, throttle control to maintain desired speed or accelerate, etc.

As depicted in FIG. 1, the TCU 50 is also configured to be in communication with the automatically controlled engine start and stop system 54. As such, the TCU 50 can control the controllable clutch 14 in response to data from the automatically controlled engine start and stop system 54. In addition, the TCU 50 is here configured to be in communication with an electronic brake system (EBS) 52. The processing circuitry 102 can either be an integral part of the TCU, or a separate part configured to be in communication with the TCU 50.

In the following, an exemplary set of operations for controlling engine start and engine stop according to examples herein will be further described. The engine start and stop function 54 is performed and controlled by the computer system 100.

The processing circuitry 102 is configured to determine an energy level in the controllable clutch 14 between a gearbox 16 and the internal combustion engine 12 of the vehicle 10 powertrain 11. The energy level is indicative of the induced energy in the clutch 14 during a time duration prior to determining the energy level.

The time duration is immediately preceding determining the energy level, and reflects the time window during which energy is accurately determined.

Determining the energy level may be based on various parameters and calculating energy levels in a clutch, such as thermal energy, is known per se in the art, and a few examples will be briefly discussed herein. For example, the processing circuitry 102 may calculate the generated energy based on the thermal energy generated in the sliding surfaces of the clutch due to friction between them.

The energy may be calculated based on the friction coefficient between the clutch plate 14*a* and the pressure plate 14*b*, the contact force between the clutch plate 14*a* and the pressure plate 14*b*, a friction radius of the clutch plates 14*a-b*, and the sliding speed between the clutch plate 14*a* and the pressure plate 14*b*, integrated over a time window(s) when the clutch is sliding or slipping and during which time duration energy is calculated. The sliding speed is a relative sliding speed (in rad/s) between the mating surfaces of the clutch plate 14*a* and the pressure plate 14*b*.

Sliding speed may further be known as clutch slip and slipping speed, and is generally the relative rotational speed between the clutch plate 14*a* and the pressure plate 14*b* of the clutch 14, and can be calculated from measurement data provided from sensor 40 measuring the rotational speed of input shaft 15 and measurement data provided from sensor 39 measuring the rotational speed of output shaft 13.

The power transferred to the clutch via the output shaft 13 of the engine can be calculated from the torque generated by the engine based on the amount of fuel injected by the fuel injector 78. The energy in the clutch 14 can be calculated by multiplying the clutch torque (Nm) and the clutch sliding speed (rad/s) and integrate over a time window(s) when the clutch is sliding or slipping.

In another possible manner, the moment of inertia of the engine and the friction torque of the engine measured in a lab using a rig, and the sliding speed in the clutch is used for calculating an average torque across the clutch for a time window. The torque acting on the engine may be calculated by a rotational version of Newton's second law of motion:

$$\text{sum of torque acting on engine [Nm]} = \text{Moment of inertia in engine [kg} * \text{m\^{}2]} * \text{mean angular acceleration in engine [rad/s\^{}2]}.$$

$$\text{The average torque in the clutch [Nm] becomes} = \text{Moment of inertia in engine [kg} * \text{m\^{}2]} * \text{mean angular acceleration in engine [rads/s\^{}2]} + \text{friction torque of the engine [Nm]} - \text{average combustion torque [Nm]}.$$

In case no fuel is injected the sum of actuating torque on the engine is the clutch torque and the friction torque of the engine 12. The combustion torque is in this case negligible or zero. Thus, the average torque in the clutch [Nm] becomes=

$$\text{Moment of inertia in engine [kg} * \text{m\^{}2]} * \text{mean angular acceleration in engine [rad/s\^{}2]} + \text{friction torque of the engine [Nm]}.$$

Friction torque is measured in rig and by that known. Moment of inertia of the engine is known from drawings (e.g., CAD) or prior made measurements. The mean angular acceleration is calculated from start and end speed of the clutch 14 and the time of the process. Sliding speed is measured at start and end of the process giving the average sliding speed.

$$\text{Generated thermal energy } [J] \text{ becomes} = \text{Average sliding speed [rad/s]} * \text{average clutch torque [Nm]} * \text{time [s]}.$$

The processing circuitry 102 controls at least one of an engine start function and an engine off function of the engine system 54 depending on the determined energy level in relation to an energy threshold level.

Generally, clutch wear depends on the energy level in the clutch. The higher energy level the higher clutch wear. Thus, it is desirable to avoid high energies in the clutch.

Preferably, the energy threshold level is associated with excessive clutch wear. That is, the energy threshold level is set so that the wear on the clutch is minimized or kept at a low level, while still allowing the clutch for starting the engine without reducing a predetermined lifetime of the clutch 14.

The energy threshold level associated with excessive clutch wear may be tailored to the specific vehicle type and vehicle use to ensure that the clutch does not wear down too fast and may be used as intended for normal operation or expected lifetime.

Plates of the clutch are equipped with clutch friction lining or facing of a given thickness. The initial clutch friction lining or facing thickness in combination with expected or estimated use of the clutch can provide an estimated lifetime for the clutch provided normal usage of the clutch. The energy threshold level may be set so that the expected clutch lifetime is not compromised more than by a margin.

Additionally, or alternatively, expected clutch lifetime may be based on clutch lining or facing data. The wear of the clutch may be calculated and calibrated based on testing in a rig and put in relation to energy in the clutch. A suitable energy threshold level may be determined based on the testing.

The energy threshold level is based on clutch lining or facing data and load collective for clutch usage for a given vehicle and vehicle usage. Load collective indicates clutch slipping energy and number of clutch actuations over the lifetime of the vehicle. Based on this, it is possible to determine how much clutch friction lining or facing is available at disposal for the engine start function and thereby also the energy threshold level.

The processing circuitry 102 may be configured to determine the energy level and control the engine start function and engine off function 54 during coasting of the vehicle 10. A coasting vehicle is a moving vehicle with the clutch 14 disengaged.

A moving vehicle is contrary to a stand-still vehicle, which is in a stationary vehicle state. A moving vehicle is in a non-stationary state. Accordingly, the computer system 100 is preferably configured to control the engine restart attempt of the vehicle 10, while the vehicle 10 is moving. The following operations may generally be performed by the processing circuitry 102 of the computer system 100 so as to control the engine restart attempt of the vehicle 10, while the vehicle 10 is moving.

The processing circuitry 102 may be configured to control the at least one of the engine start function and the engine off function of the engine start and stop system 54 only when the determined energy level is below the energy threshold level. Preferably, this relates to using the clutch 54 for engine start, and provides advantages related to avoiding excessive clutch wear. However, it may be allowed for the processing circuitry 102 to instead use the start motor 76 in this case for starting the engine 12.

The processing circuitry 102 may be configured to calculate a predicted energy level in the clutch 14. The predicted energy level being a sum of the determined energy level and a potential additional energy resulting from using the clutch 14 for engine start function. That is, a present energy level in the clutch and the addition of a predicted additional energy generated in the clutch if the clutch was used for starting the engine 12.

In a situation where the engine is already shut down, that is, is in an off state, there are two possible outcomes of a comparison of the prediction energy level to the energy threshold level.

Firstly, the processing circuitry 102 may determine that the predicted energy level is below the energy threshold level. In this case, the processing circuitry 102 controls, via the engine start and stop function 54, the clutch 14 for performing the engine start function.

Secondly, the processing circuitry 102 may determine that the predicted energy level exceeds or is equal to the energy threshold level. In this case, the processing circuitry 102 controls, via the engine start and stop function 54, the starter motor 76 for performing the engine start function.

To engage the clutch 14, the processing circuitry 102 controls the controllable clutch 14 to a torque transfer position. In the torque transfer position, the controllable clutch 14 is set in a state in which torque is transferable between the engine 12 and the wheels 20, more specifically the driven wheels 21 (here also corresponding to the rear wheels). Hence, by the controlling controllable clutch 14 to the torque transfer position, the controllable clutch 14 is allowed to change a torque transfer between the engine 12 and the wheels 21. In this manner, the computer system 100 is configured to initiate the engine restart attempt. The controllable clutch 14 can be controlled in several different manners. By way of example, the controllable clutch 14 is controlled to gradually change the torque transfer between the engine 12 and the wheels 21. Alternatively, or in addition, the controllable clutch 14 can be controlled to change the torque transfer between the engine 12 and the wheels 21 in step-wise manner. Hence, the clutch 14 can either be set in a partly engaged state or in a fully engaged state so as to initiate the engine restart attempt.

The predicted energy level includes a decay in energy, or heat, in the clutch from the time of the determined energy level. That is, the determined energy level may be determined at a first time instant. The energy level in the clutch decays after the first time instant when the clutch 14 cools down. When the potential additional energy in the clutch is determined it may include the decay in energy. The decay may for example be estimated as heat convection from the clutch 14 to the surrounding air. The potential additional energy is a calculated energy in the clutch 14 if the clutch 14 was used, given the present speed of the shaft 15. Thus, the potential additional energy is the energy generated, given the decay, if the clutch 14 was engaged at the present time.

In other examples, the processing circuitry 102 may be configured to calculate the predicted energy level in the clutch. Again, the predicted energy level is a sum of the determined energy level and a potential additional energy resulting from using the clutch 14 for engine start function.

In this case, the engine 12 is on, that is, the engine 12 is operative and provides output torque by combusting fuel. In this situation where the engine is on, there are two possible outcomes of a comparison of the prediction energy level to the energy threshold level.

Firstly, the processing circuitry 102 may determine that the predicted energy level exceeds or is equal to the energy threshold level. In other words, the clutch 14 should be avoided for engine start. In this case, the processing circuitry 102 controls the engine off function and engine start function 54 to avoid engine off. In other words, the engine 12 is kept on. This may be especially useful when, based on GPS data, the processing circuitry may determine that the engine 12 will soon be needed again.

Secondly, the processing circuitry 102 may determine that the predicted energy level is below the energy threshold level. In this case, the clutch 14 may be used for an upcoming engine start without risking the generated energy in the clutch 14 to exceed the threshold level. Then, the processing circuitry 102 control the engine off function and engine start function 54 to turn off the engine.

The processing circuitry 102 may be configured to determine the energy level in the clutch 14 in response to that at least one of the following occurs: vehicle travelling start with the internal combustion engine running; start of the internal combustion engine using the clutch when the vehicle is moving; and a gear shift that enables engine acceleration using the clutch. Generally, a software controlling the transmission 17 have different states. Each of the above at least one situation has its own state. Clutch thermal energy is calculated at these states according to the methods described above.

There is further provided a vehicle power train 11 comprising a transmission 16, a combustion engine 12, and a controllable clutch 14, the transmission 16 being coupled to the combustion engine 12 by the controllable clutch 14, the vehicle power train further comprising the computer system 100.

There is further provided a vehicle 10 comprising the computer system 100 and/or the power train 11.

Figure 2:
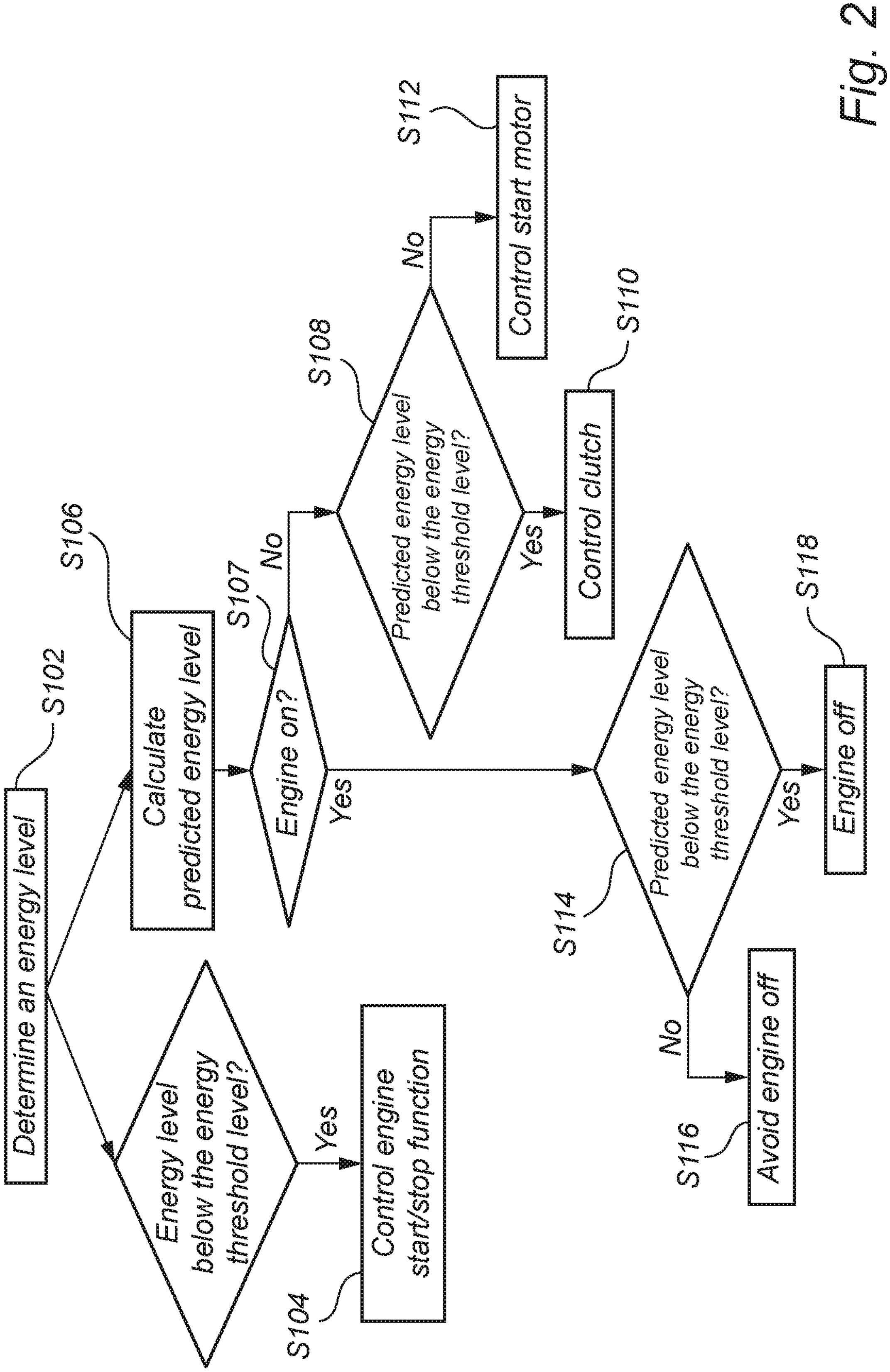
FIG. 2 is a flow chart of an exemplary method to control engine start and engine off.

FIG. 2 is a flow-chart of method steps of a computer implanted method to control engine start and engine off.

In step S102, determining, by processing circuitry 102 of a computer system 100, an energy level in a controllable clutch between a transmission 16 and a combustion engine 12 of a vehicle powertrain 11. The energy level is indicative of the induced energy in the clutch 14 during a time duration prior to determining the energy level.

In case the determined energy level is below the energy threshold level, controlling in step S104, by the processing circuitry 102, at least one of an engine start function and an engine off function provide by the engine start and stop system 54.

In step S106, calculating, by the processing circuitry 102, a predicted energy level in the clutch 14. The predicted energy level is a sum of the determined energy level and a potential additional energy resulting from using the clutch 14 for engine start function.

In case the engine is off, as evaluated by the processing circuitry 102 in step S107, and the processing circuitry 102 determines, in step S108, that the predicted energy level is below the energy threshold level, the processing circuitry 102 controls, in step S110 the clutch 14 for performing the engine start function.

However, if the processing circuitry determines, in step S108, that the predicted energy level exceeds or is equal to the energy threshold level, the processing circuitry 102 controls, in step S112, a starter motor 76 for performing the engine start function.

Returning to the status of the engine 12 determined by the processing circuitry 102 in step S107. If the engine 12 is on, and the processing circuitry 102 determines, in step S114, that the predicted energy level exceeds or is equal to the energy threshold level, then the processing circuitry 102 controls the engine off function and engine start function 54 to avoid engine off in step S116.

On the other hand, when the processing circuitry 102, determines, in step S114 that the predicted energy level is below the energy threshold level, the processing circuitry 102 controls the engine off function and engine start function 54 to turn off the engine 12.

In possible implementation, the method may be triggered to determine the energy level in the clutch in response to that at least one of the following occurs: a vehicle travelling start with the internal combustion engine running; start of the internal combustion engine using the clutch when the vehicle is moving; and a gear shift that enables engine acceleration using the clutch without fuel injection.

Figure 3:
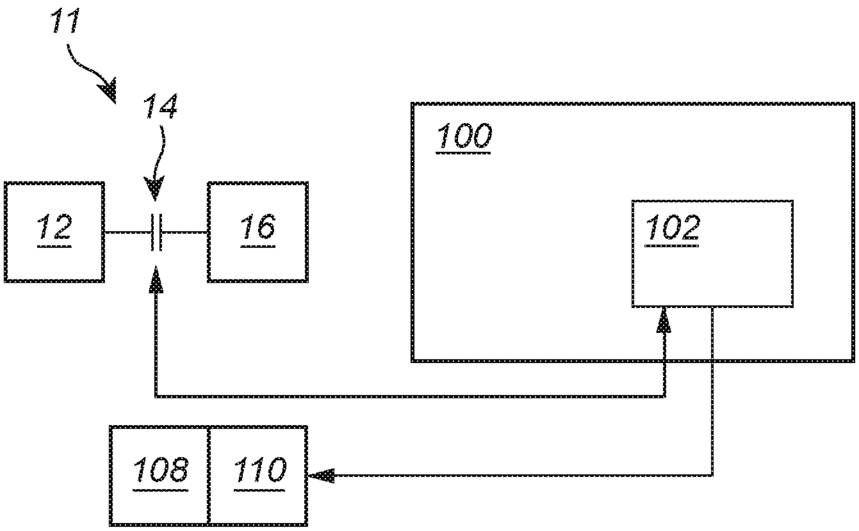
FIG. 3 is a diagram of a computer system according to another view of FIG. 1, according to an example.

FIG. 3 is another view of FIG. 1, according to an example. FIG. 3 is a system diagram of a computer system 100 comprising processing circuitry 102 configured to: determine an energy level in a controllable clutch 14 between a transmission 16 and an internal combustion engine 12 of a vehicle powertrain 11, the energy level is indicative of the induced energy in the clutch 14 during a time duration prior to determining the energy level, and control at least one of an engine start function 108 and an engine off function 110 depending on the determined energy level in relation to an energy threshold level associated with excessive clutch wear.

Figure 4:
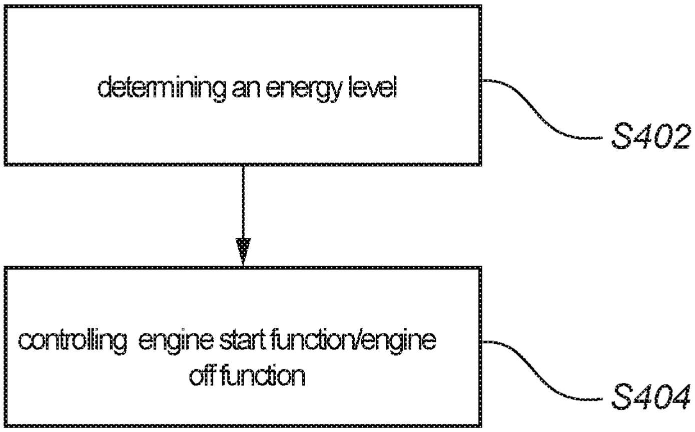
FIG. 4 is a flow chart of an exemplary method to control engine start and engine off according to an example.

FIG. 4 is a flow chart of a method according to an example. In step S402 determining, by processing circuitry of a computer system, an energy level in a controllable clutch between a transmission and a combustion engine of a vehicle powertrain, the energy level is indicative of the induced energy in the clutch during a time duration prior to determining the energy level. In step S404, controlling, by the processing circuitry, at least one of an engine start function and an engine off function depending on the determined energy level in relation to an energy threshold level associated with excessive clutch wear.

Figure 5:
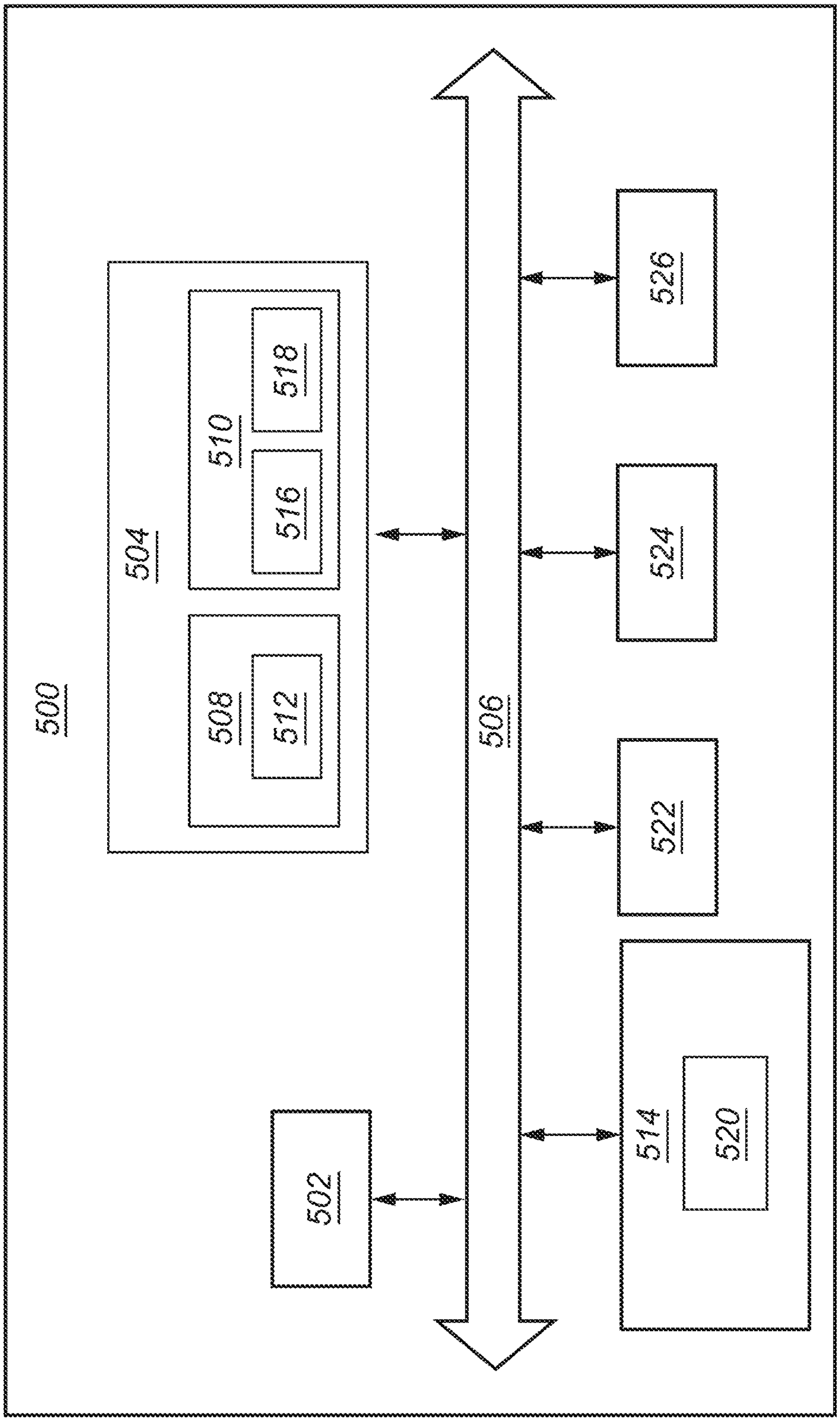
FIG. 5 is a schematic diagram of an exemplary computer system for implementing examples disclosed herein, according to an example.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus

506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to: determine an energy level in a controllable clutch between a transmission and a combustion engine of a vehicle powertrain, the energy level is indicative of the induced energy in the clutch during a time duration prior to determining the energy level, control at least one of an engine start function and an engine off function depending on the determined energy level in relation to an energy threshold level associated with excessive clutch wear.

Example 2: The computer system of example 1, wherein the processing circuitry is further configured to: determine the energy level and control the engine start function and engine off function during coasting of the vehicle.

Example 3: The computer system of any of examples 1-2, wherein the processing circuitry is further configured to: control the at least one of the engine start function and the engine off function only when the determined energy level is below the energy threshold level.

Example 4: The computer system of any of examples 1-3, wherein the processing circuitry is further configured to: calculate a predicted energy level in the clutch, the predicted energy level being a sum of the determined energy level and a potential additional energy resulting from using the clutch for engine start function, determine that the predicted energy level is below the energy threshold level, and control the clutch for performing the engine start function.

Example 5: The computer system of any of examples 1-3, wherein the processing circuitry is further configured to: calculate a predicted energy level in the clutch, the predicted energy level being a sum of the determined energy level and a potential additional energy resulting from using the clutch for engine start function, determine that the predicted energy level exceeds or is equal to the energy threshold level, and control a starter motor for performing the engine start function.

Example 6: The computer system of any of examples 1-3, wherein the processing circuitry is further configured to: calculate a predicted energy level in the clutch, the predicted energy level being a sum of the determined energy level and a potential additional energy resulting from using the clutch for engine start function, determine that the predicted energy level exceeds or is equal to the energy threshold level, and control the engine off function and engine start function to avoid engine off.

Example 7: The computer system of any of examples 1-3, wherein the processing circuitry is further configured to: calculate a predicted energy level in the clutch, the predicted energy level being a sum of the determined energy level and a potential additional energy resulting from using the clutch for engine start function, determine that the predicted energy level is below the energy threshold level, and control the engine off function and engine start function to turn off the engine.

Example 8: The computer system of any of examples 1-7, wherein the processing circuitry is further configured to determine the energy level in the clutch in response to that at least one of the following occurs: vehicle travelling start with the internal combustion engine running; start of the internal combustion engine using the clutch when the vehicle is moving; and a gear shift that enables engine acceleration using the clutch without fuel injection.

Example 9: A vehicle power train comprising a transmission, a combustion engine, and a controllable clutch, the transmission being coupled to the combustion engine by the controllable clutch a clutch, the vehicle power train further comprising the computer system of any of examples 1-7.

Example 10: A vehicle comprising the computer system of any of examples 1-8 and/or the power train of example 9.

Example 11: A computer-implemented method, comprising: determining, by processing circuitry of a computer system, an energy level in a controllable clutch between a transmission and a combustion engine of a vehicle powertrain, the energy level is indicative of the induced energy in the clutch during a time duration prior to determining the energy level, and controlling, by the processing circuitry, at least one of an engine start function and an engine off function depending on the determined energy level in relation to an energy threshold level associated with excessive clutch wear.

Example 12: The method of example 11, comprising: determining, by the processing circuitry, the energy level and control the engine start function and engine off function during coasting of the vehicle.

Example 13: The method of any of examples 11-12, comprising: controlling, by the processing circuitry, the at least one of the engine start function and the engine off function only when the determined energy level is below the energy threshold level.

Example 14: The method any of examples 11-13, comprising: calculating, by the processing circuitry, a predicted energy level in the clutch, the predicted energy level being a sum of the determined energy level and a potential additional energy resulting from using the clutch for engine start function, determining, by the processing circuitry, that the predicted energy level is below the energy threshold level, and controlling, by the processing circuitry, the clutch for performing the engine start function.

Example 15: The method of any of examples 11-14, comprising: calculating, by the processing circuitry, a predicted energy level in the clutch, the predicted energy level being a sum of the determined energy level and a potential additional energy resulting from using the clutch for engine start function, determining, by the processing circuitry, that the predicted energy level exceeds or is equal to the energy threshold level, and controlling, by the processing circuitry, a starter motor for performing the engine start function.

Example 16: The method of any of examples 11-14, comprising: calculating, by the processing circuitry, a predicted energy level in the clutch, the predicted energy level being a sum of the determined energy level and a potential additional energy resulting from using the clutch for engine start function, determining, by the processing circuitry, that the predicted energy level exceeds or is equal to the energy threshold level, and controlling, by the processing circuitry, the engine off function and engine start function to avoid engine off.

Example 17: The method of any of examples 11-14, comprising: calculating, by the processing circuitry, a predicted energy level in the clutch, the predicted energy level being a sum of the determined energy level and a potential additional energy resulting from using the clutch for engine start function, determining, by the processing circuitry, that the predicted energy level is below the energy threshold level, and controlling, by the processing circuitry, the engine off function and engine start function to turn off the engine.

Example 18: The method of any of examples 11-17, comprising determining, by the processing circuitry, the energy level in the clutch in response to that at least one of the following occurs: vehicle travelling start with the internal combustion engine running; start of the internal combustion engine using the clutch when the vehicle is moving; and a gear shift that enables engine acceleration using the clutch without fuel injection.

Example 19: A computer program product comprising program code for performing, when executed by the processing circuitry, the method of any of examples 11-18.

Example 20: A non-transitory computer-readable storage medium comprising instructions, which when executed by the processing circuitry, cause the processing circuitry to perform the method of any of examples 11-18.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:

determine an energy level in a controllable clutch between a transmission and a combustion engine of a vehicle powertrain, the energy level is indicative of the induced energy in the clutch during a time duration prior to determining the energy level, control at least one of an engine start function and an engine off function depending on the determined energy level in relation to an energy threshold level, calculate a predicted energy level in the clutch, the predicted energy level being a sum of the determined energy level and a potential additional energy resulting from using the clutch for engine start function, and determine that the predicted energy level is below the energy threshold level, and control the clutch for performing the engine start function.

2. The computer system of claim 1, wherein the processing circuitry is further configured to:

determine the energy level and control the engine start function and engine off function during coasting of the vehicle.

3. The computer system of claim 1, wherein the processing circuitry is further configured to:

control the at least one of the engine start function and the engine off function only when the determined energy level is below the energy threshold level.

4. The computer system of claim 1, wherein the processing circuitry is further configured to:

determine that the predicted energy level exceeds or is equal to the energy threshold level, and control a starter motor for performing the engine start function.

5. The computer system of claim 1, wherein the processing circuitry is further configured to:

determine that the predicted energy level exceeds or is equal to the energy threshold level, and control the engine off function and engine start function to avoid engine off.

6. The computer system of claim 1, wherein the processing circuitry is further configured to:

determine that the predicted energy level is below the energy threshold level, and control the engine off function and engine start function to turn off the engine.

7. The computer system of claim 1, wherein the processing circuitry is further configured to determine the energy level in the clutch in response to that at least one of the following occurs:

vehicle travelling start with the internal combustion engine running;

start of the internal combustion engine using the clutch when the vehicle is moving; and a gear shift that enables engine acceleration using the clutch.

8. A vehicle power train comprising a gearbox, a combustion engine, and a controllable clutch, the gearbox being coupled to the combustion engine by the controllable clutch, the vehicle power train further comprising the computer system of claim 1.

9. A vehicle comprising the computer system of claim 1 and a power train.

10. A computer-implemented method, comprising:

determining, by processing circuitry of a computer system, an energy level in a controllable clutch between a transmission and a combustion engine of a vehicle powertrain, the energy level is indicative of the induced energy in the clutch during a time duration prior to determining the energy level, controlling, by the processing circuitry, at least one of an engine start function and an engine off function depending on the determined energy level in relation to an energy threshold level, calculating, by the processing circuitry, a predicted energy level in the clutch, the predicted energy level being a sum of the determined energy level and a potential additional energy resulting from using the clutch for engine start function, determining, by the processing circuitry, that the predicted energy level is below the energy threshold level, and controlling, by the processing circuitry, the clutch for performing the engine start function.

11. The method of claim 10, comprising:

determining, by the processing circuitry, the energy level and control the engine start function and engine off function during coasting of the vehicle.

12. The method of claim 10, comprising:

controlling, by the processing circuitry, the at least one of the engine start function and the engine off function only when the determined energy level is below the energy threshold level.

13. The method of claim 10, comprising:

determining, by the processing circuitry, that the predicted energy level exceeds or is equal to the energy threshold level, and controlling, by the processing circuitry, a starter motor for performing the engine start function.

14. The method of claim 10, comprising:

determining, by the processing circuitry, that the predicted energy level exceeds or is equal to the energy threshold level, and controlling, by the processing circuitry, the engine off function and engine start function to avoid engine off.

15. The method of claim 10, comprising:

determining, by the processing circuitry, that the predicted energy level is below the energy threshold level, and controlling, by the processing circuitry, the engine off function and engine start function to turn off the engine.

16. The method of claim 10, comprising determining, by the processing circuitry, the energy level in the clutch in response to that at least one of the following occurs:

vehicle travelling start with the internal combustion engine running;

start of the internal combustion engine using the clutch when the vehicle is moving; and a gear shift that enables engine acceleration using the clutch.

17. A non-transitory computer-readable storage medium comprising instructions, which when executed by the processing circuitry, cause the processing circuitry to perform the method of claim 10.

* * * * *